United States Patent [19]

Sayles

[11] 3,770,526

[45] Nov. 6, 1973

[54] COMBUSTION COMPOSITION CONTAINING A FERROCENYL OR CARBORAMYL DERIVATIVE

[75] Inventor: David C. Sayles, Huntsville, Ala.

[73] Assignee: The United States of America as represented by the Secretary of the Army, Washington, D.C.

[22] Filed: Nov. 26, 1971

[21] Appl. No.: 202,694

[52] U.S. Cl.................. 149/22, 149/42, 149/44, 149/76
[51] Int. Cl............................................ C06b 15/00
[58] Field of Search .................... 149/5, 42, 22, 44, 149/76, 82

[56] References Cited
UNITED STATES PATENTS

| | | | |
|---|---|---|---|
| 3,689,331 | 9/1972 | Pierce............................. | 149/38 X |
| 3,056,701 | 10/1962 | Fritzlen........................... | 149/76 X |
| 3,092,528 | 6/1963 | Loving............................ | 149/82 X |
| 3,098,777 | 7/1963 | Anderson........................ | 149/82 X |
| 3,172,793 | 3/1965 | Markowitz...................... | 149/76 X |
| 3,505,409 | 4/1970 | Bobinski......................... | 149/76 X |
| 2,407,151 | 9/1946 | Glogan............................ | 149/5 |

Primary Examiner—Stephen J. Lechert, Jr.
Attorney—Harry M. Saragovitz et al.

[57] ABSTRACT

A combustion composition comprising a member selected from the group consisting of ferrocene, carborane, ferrocenyl and carboranyl derivatives; activated carbon; ammonium perchlorate; and aluminum powder. In operation, pellets or granules of the mixture are coated with calcium phosphate and applied to a combustible substrate.

4 Claims, No Drawings

COMBUSTION COMPOSITION CONTAINING A FERROCENYL OR CARBORAMYL DERIVATIVE

The invention described herein may be manufactured, used, and licensed by or for the Government for governmental purposes without the payment to me of any royalty thereon.

This invention disclosure pertains to catalytic compositions which markedly accelerate the oxidative reaction of atmospheric oxygen with combustible materials thereby resulting in their consumption.

Napalm or defoliants have been utilized in the destruction or burning of forests and jungles. The present composition constitutes an improvement over prior art agents in that it is more effective and considerably less expensive than the use of napalm or defoliants. The success of this invention is dependent upon the use of ferrocene or carborane ($C_2B_{10}H_{12}$) and ferrocenyl or carboranyl derivatives having alkyl substituents of one to 12 carbons atoms, e.g., n-methylferrocene, n-butylferrocene, n-octylferrocene, n-dodecylferrocene, n-methylcarborane, n-butylcarborane, n-octylcarborane and n-dodecylcarborane, along with other constituents to produce a composition which effectively catalyzes the interaction of atmospheric oxygen with any combustible substrate. The present composition functions with little degration of activity or interference by the high moisture content of the substrate that is to be consumed. The rate at which the combustible material is consumed by this oxidative process is admittedly influenced by such parameters as density of the dispersion pattern, atmospheric conditions, etc.

It is an object of this invention to provide and disclose an improved combustion composition.

It is a further object of this invention to provide and disclose the use of an improved combustion composition.

Other objects and a fuller understanding of the invention may be ascertained from the following description and claims.

A representative composition of the present formulation consists of the following components in the parts by weight indicated:

| | |
|---|---|
| n-butylferrocene | 80–90 |
| activated carbon | 5–10 |
| ammonium perchlorate | 2.5–5 |
| aluminum powder | 2.5–5 |

The ammonium perchlorate utilized had a particle size of about 2–5 microns and the aluminum powder had a particle size of about 60 microns.

The composition was compounded by absorbing the n-butylferrocene onto the activated carbon. The resultant mixture was then blended with the ammonium perchlorate followed with the aluminum powder. The resulting pellets or granules are subsequentially coated or prilled with calcium phosphate or a silicon compound sold under the trademark of Alon-C to produce a material that is free flowing and readily dispersible.

The finely-powdered activated carbon has the dramatic ability of functioning synergistically with the burning rate catalysts by providing the large surface area which is exposed to the atmosphere and to which atmospheric oxygen can become absorbed. The aluminum powder and ammonium perchlorate provide a sufficiently high combustion temperature to insure a sustained faster rate of combustion of the combustible substrate. The present composition eliminates the need for an ignition device since the combustion is self-initiating after a brief initial inhibitory period.

The combustibility characteristics of the present composition were assessed using a wood specimen having dimensions of 2 inches × 4 inches × 1 foot in length. In order to stimulate conditions characteristic of jungles, the specimen was immersed in a tank of water which contain 0.2 percent of a surfactant sold under the trademark of Alkaterge (Commercial Solvents Corporation) to insure complete saturation of the log with moisture. A small quantity of the present composition, i.e., 0.1 gram, was positioned on the log. Combustion and smoldering of the log began after a brief induction period and the smoldering continued until the log was completely consumed.

A comparison was made in which a similar quantity of kerosene was applied to a log in order to simulate the action of napalm. When the kerosene was ignited with a match, it burned briefly and then died out without even superficially charring the log.

In addition to the destruction of undesired woody materials, it is envisaged that the present invention could be utilized for destroying large quantities of petroleum-based fuels which have been inadvertently dispersed over large areas of the oceans.

Although I have described my invention with a certain degree of particularity, it is understood that the present disclosure has been made only by way of example. Therefore, I do not desire to be limited to the exact details of formulation and use, shown and described, for obvious modifications will occur to a person skilled in the art.

Having described my invention, I claim:

1. A combustion composition consisting of the following components:
   a. about 80–90 parts by weight of a catalyst selected from the group consisting of ferrocene, n-methylferrocene, n-butylferrocene, n-octylferrocene, n-dodecylferrocene, carborane, n-methylcarborane, n-butylcarborane, n-octylcarborane, and n-dodecylcarborane,
   b. about 5–10 parts by weight of activated carbon,
   c. about 2.5–5 parts by weight of ammonium perchlorate, and
   d. about 2.5–5 parts of weight of aluminum powder.

2. A composition in accordance with claim 1 coated with a material selected from the group consisting of calcium phosphate and a silica compound.

3. A composition in accordance with claim 1 wherein the catalyst is n-butylferrocene.

4. A composition in accordance with claim 1 wherein the catalyst is n-hexylcarborane.

* * * * *